UNITED STATES PATENT OFFICE.

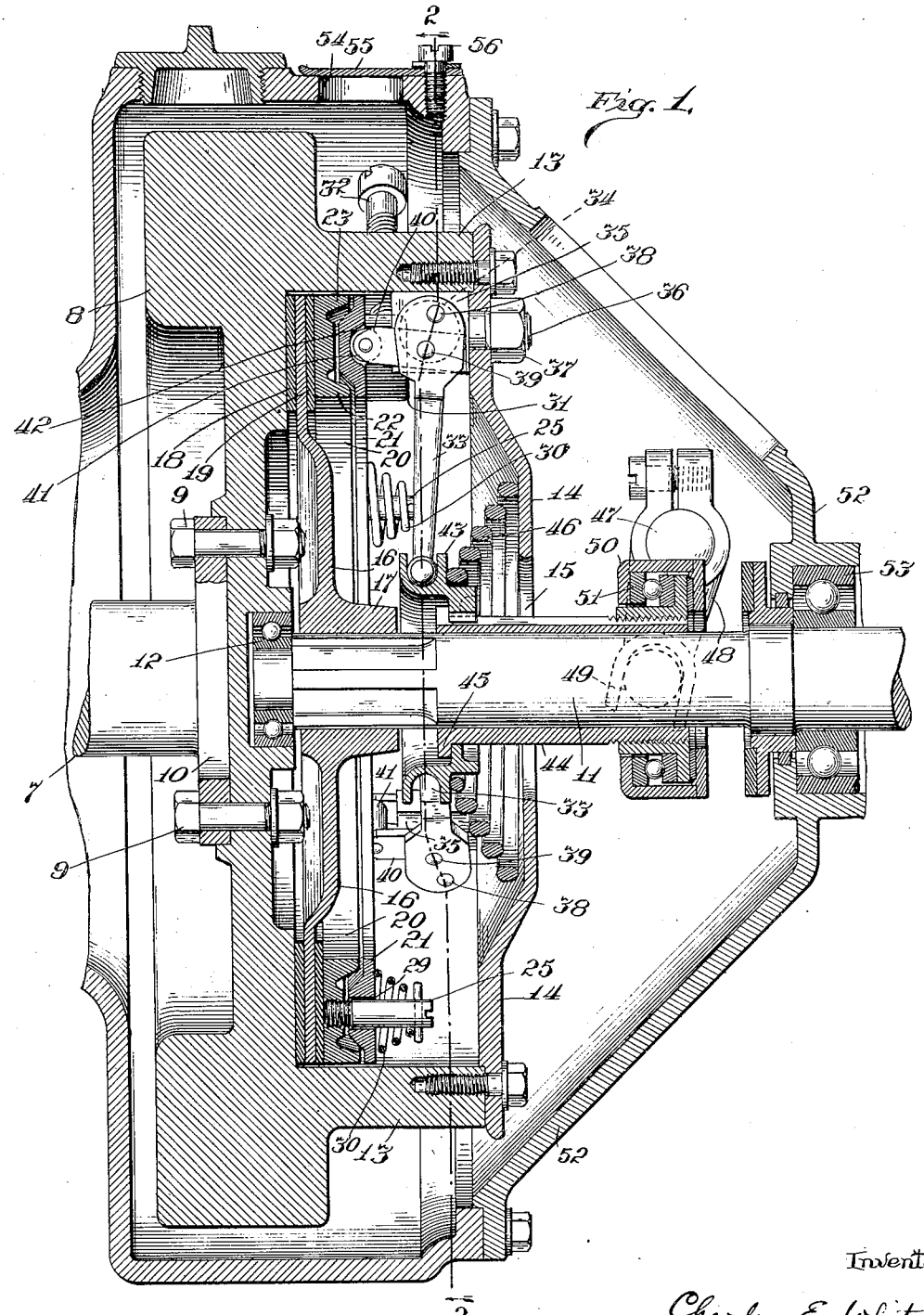

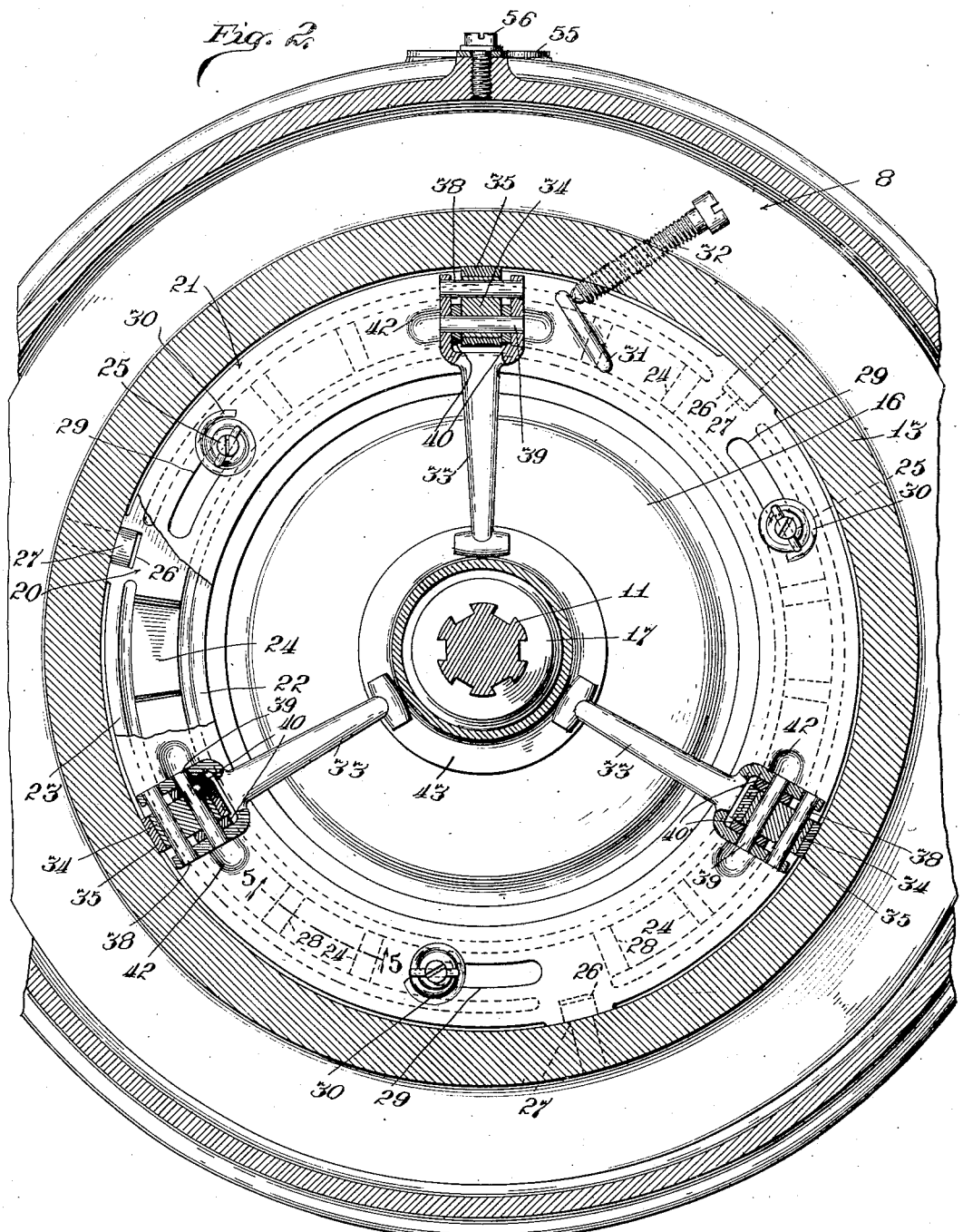

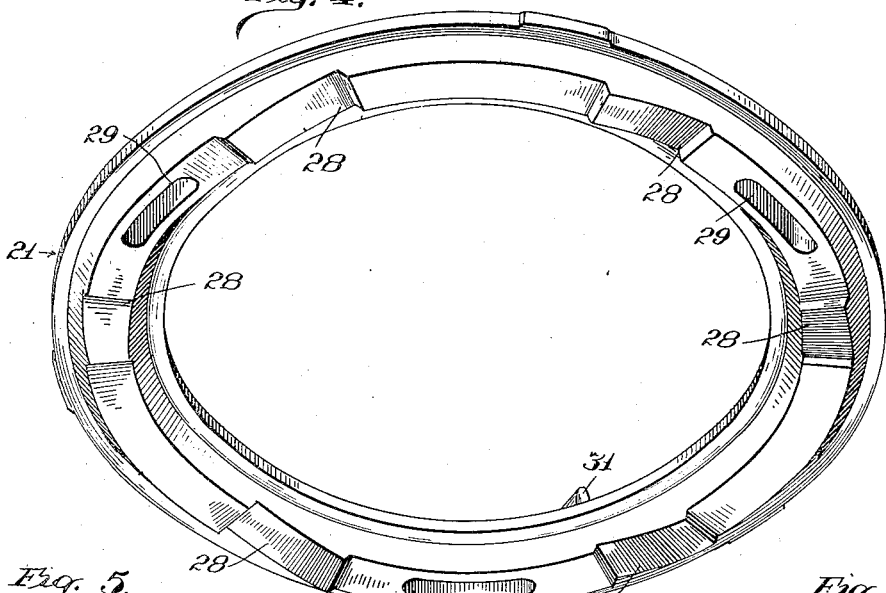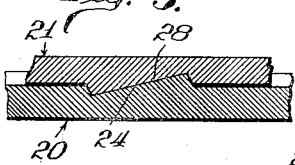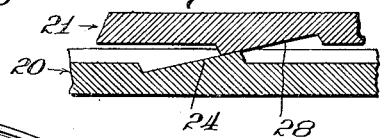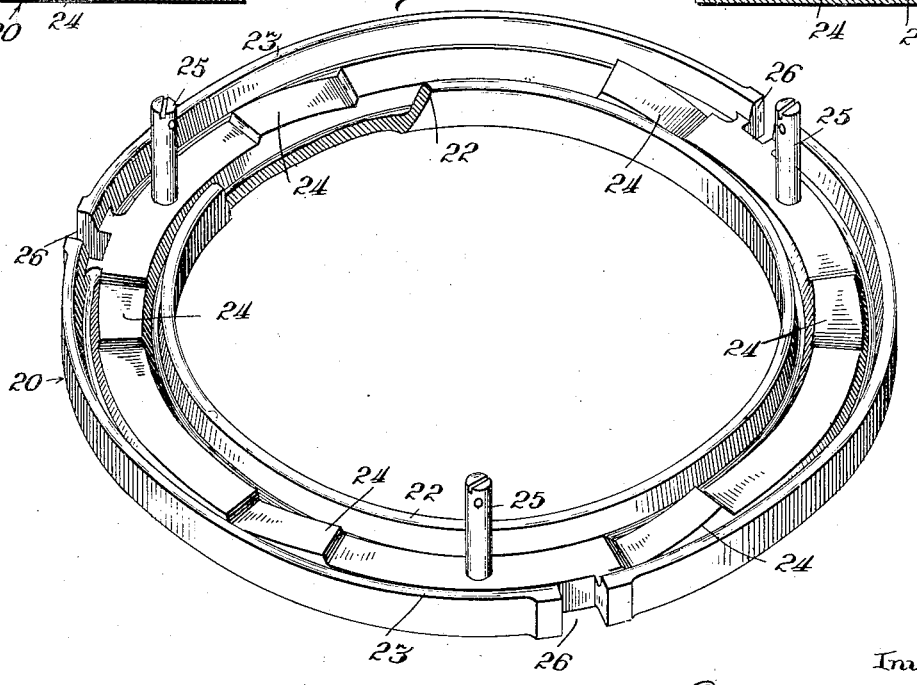

CHARLES E. WHITE, OF MOLINE, ILLINOIS.

FRICTION-CLUTCH.

1,330,965.

Specification of Letters Patent. Patented Feb. 17, 1920.

Application filed March 28, 1919. Serial No. 285,713.

*To all whom it may concern:*

Be it known that I, CHARLES E. WHITE, a citizen of the United States, and a resident of Moline, in the county of Rock Island and State of Illinois, have invented certain new and useful Improvements in Friction-Clutches, of which the following is a specification, reference being had to the accompanying drawings.

My invention relates to friction clutches such as are commonly used in motor vehicles for connecting the source of power or crank shaft with the transmission mechanism, and has for its object to provide an improved clutch which may readily be adjusted to take up wear without removing or opening up the housing in which the operating parts of the mechanism are inclosed. A further object is to provide certain other improvements the nature of which will be hereinafter set forth. What I regard as new will be set forth in the claims.

In the accompanying drawings,—

Figure 1 is a central longitudinal section of my improved clutch and the parts which coöperate therewith;

Fig. 2 is a vertical cross-section on line 2—2 of Fig. 1;

Figs. 3 and 4 are perspective views of the two annular plates which form a thrust member through which pressure is applied to one of the clutch members to move it into operative engagement with the other clutch member; and Figs. 5 and 6 are fragmentary sectional views of the members shown in Figs. 3 and 4, showing the arrangement by which the thickness of said thrust member is varied to compensate for wear on the friction surfaces of one of the clutch members.

It will be understood that while I have shown my improved clutch as applied to the power plant of an automobile and the description thereof is directed to the illustrated construction, it may also be used in any other situation to which it is adapted, and the claims hereinafter made are, therefore, to be construed accordingly.

Referring to the drawings,—7 indicates the crank shaft of an automobile and 8 a fixed clutch member mounted upon and secured to said crank shaft, which in the instance illustrated also constitutes a fly-wheel, although that is not essential. Said clutch member is illustrated as being secured to the crank shaft 7 by bolts 9 which connect it with a collar or flange 10 at the inner end of the crank shaft, as shown in Fig. 1. For convenience of description the clutch member 8 will be referred to as the driving clutch member. 11 indicates a shaft axially alined with the crank shaft 7 and which may conveniently be termed the driven shaft, as in the arrangement illustrated it is driven from the crank shaft 7. It will be understood, however, that the shaft 11 can be driven directly by a prime mover so that the shaft 7 would then be the driven shaft and the clutch member 8 would then be the driven clutch member. The end of the shaft 11 adjacent to the opposing end of the shaft 7 is arranged to abut against an anti-friction bearing 12 mounted in a suitable recess in the clutch member 8 and arranged to take the end thrust between said parts. 13 indicates a laterally projecting annular flange carried by the clutch member 8 forming a cup-like recess at the rear side of said clutch member to receive the operating parts of the clutch. 14 indicates a cover plate secured to the rear margin of the flange 13 and provided with an axial opening 15 through which the shaft 11 extends. 16 indicates a movable clutch member which is adapted to coöperate with the fixed clutch member 8 to operatively connect the shafts 7 and 11. The movable clutch member 16 is in the form of a disk having a hub 17 which is mounted upon the inner end of the shaft 11 so as to be movable longitudinally thereof but to rotate therewith. Any suitable construction for this purpose may be employed. The outer portion of the clutch member 16 lies parallel with the adjacent face of the clutch member 8 and it is provided on its opposite faces near its periphery with friction bands 18—19, the band 18 being interposed between the two clutch members, as shown in Fig. 1.

20—21 indicate two annular plates which are fitted in the recess above mentioned and together compose an expansible or contractible thrust block through which pressure is applied to the movable clutch member 16 to force it into operative engagement with the clutch member 8, the plate 20 serving also to frictionally engage the band 19 and assist in operatively connecting the clutch member 16 with the clutch member 8 owing to the fact that said plate is non-rotatably connected with the clutch member 8, as will be hereinafter pointed out. The plate 20 may appropriately be termed the inner plate as it is nearer the bottom of the recess in the clutch member 8 than the plate 21, which may therefore be termed the outer plate. The construction of the annular plates 20—21 is best shown in Figs. 3 to 6. Referring particularly to Figs. 1 and 3, it will be noted that the inner plate 20 has a flat surface at one side which bears against the friction band 19 and at the other side is provided with inner and outer flanges 22—23, respectively, forming a channel in which are a number of inclined bearing surfaces 24 arranged at regular intervals around said plate, and also a number of posts 25, the purpose of which will be hereinafter explained. The peripheral portion of the plate 20 is provided with a series of notches or grooves 26 which are adapted to receive the heads of bolts 27 secured to the flange 13 of the clutch member 8, as shown in Fig. 2. The purpose of this arrangement is to hold the plate 20 against rotation relatively to the clutch member 8 while permitting it to move longitudinally with reference to the shaft 11. The outer annular plate 21 is adapted to overlie the inner plate 20, its inner surface being provided with a series of inclined bearing surfaces 28 which are adapted to bear upon the corresponding surfaces 24 of the plate 20, as shown in Figs. 5 and 6. It will be evident that when the parts are in the position shown in Fig. 5 the plates 20—21 will lie close together, but by rotating the outer plate 21 relatively to the inner plate 20 the inclined surfaces 28 by their movement upon the inclined surfaces 24 will operate to move said plates apart, thereby expanding or increasing the effective thickness of the thrust member as a whole. The two annular plates 20—21 are held in operative relation to each other so that a limited rotary movement of the plate 21 is permitted by extending the posts 25 through arcuate slots 29 in the plate 21, as shown in Fig. 1, and mounting spiral springs 30 upon said posts so as to yieldingly hold the plate 21 against the plate 20, as shown in said figure. 31 indicates an inclined lug which projects laterally from the outer surface of the ring 21, as best shown in Fig. 2, and 32 indicates an adjusting screw fitted in the flange 13 of the clutch member 8 in position to engage said lug. By this arrangement by adjusting the screw 32 tangential pressure may be applied to the plate 21 to rotate it with reference to the plate 20 so as to increase the effective thickness of the thrust member in the manner above described. Adjusting of the screw 32 in the opposite direction will contract or reduce the thickness of said thrust member as the plates 20—21 will then move closer together under the action of the springs 30.

Pressure is applied to the thrust member to move the clutch member 16 into operative engagement with the clutch member 8 by means of a series of levers 33, the arrangement of which is best shown in Figs. 1 and 2. As shown in Fig. 2, said levers are preferably three in number and are radially disposed about the clutch. They are pivotally supported at their outer ends by means of cylindrical journals or pivots 34 which are mounted in blocks 35 carried at the inner ends of bolts 36 which extend through the cover plate 14 and are secured by nuts 37, as shown in Fig. 1, the blocks 35 being drawn up tightly against the inner face of said cover plate as shown. Said blocks also bear against the inner surface of the flange 13 so that they are firmly secured in position. The outer ends of the levers 33 are bifurcated, as shown in Fig. 2, and they are rigidly secured to the pivots 34 by pins 38—39 disposed at opposite sides of the axes of said pivots so that the levers are very securely connected with said pivots. 40 indicates bifurcated thrust bars which are connected to the levers 33 by the pins 39 so that they are carried by said levers between the axes about which said levers swing and the inner ends of said levers. Said thrust bars are adapted to bear against the outer portion of the ring 21 and are preferably provided with rollers 41 at their outer ends, as shown in Fig. 1. These rollers bear in arcuate depressions or recesses 42 provided in the outer face of the ring 21, as shown in Figs. 1 and 2, to allow for the rotation of said ring. It is manifest that by moving the inner ends of the levers 33 inwardly, or toward the clutch member 16, the thrust bars 40 will force the plate 21 in the same direction, thereby binding the friction surfaces of the clutch member 16 tightly between the plate 20 and the clutch member 8, the clutch member 16 moving longitudinally as required to permit such action. It will also be evident that by slightly rotating the plate 21 to vary the thickness of the thrust member as a whole the proper pressure may always be applied to the friction surfaces so that the efficiency of the clutch may be maintained notwithstanding the wearing away of the friction surfaces. To accomplish this it is necessary only to apply a screwdriver to the screw 32 and turn the screw in the proper direction.

Any suitable means may be provided for simultaneously and similarly operating the levers 33, and for this purpose I have shown a peripherally grooved collar 43 which is carried by a sleeve 44 loosely mounted on the shaft 11 and movable longitudinally thereof. At its inner end the sleeve 44 is provided with a peripheral flange 45 which engages the collar 43 so that when said sleeve is moved longitudinally the collar 43 moves with it. A spring 46 mounted on the collar 43 and bearing against the cover plate 14 tends to move said collar and the sleeve 44 to the left from the position shown in Fig. 1, and therefore to operate the levers 33 to apply the clutch. For moving the levers 33 in the opposite direction I employ the usual operating lever (not shown) which is mounted upon a shaft 47, said shaft being provided with arms 48 which engage trunnions 49 carried by the housing 50 of an anti-friction bearing 51 by which the sleeve 44 is supported. Thus, by rocking the shaft 47, the sleeve 44 may be moved longitudinally to apply or release the clutch.

It will be observed that the principal operating parts of the clutch are all inclosed by the clutch member 8 and the cover plate 14, and that the adjustment of the thrust member may be made without removing the cover plate or disturbing any of the parts of the clutch. The clutch as a whole is further inclosed by a housing 52 which extends around the clutch as a whole, including the adjacent end portions of the driving and driven shafts, said housing being also preferably provided with an anti-friction bearing 53 which supports the driven shaft 11, as shown in Fig. 1. Said housing is provided with an opening 54 which overlies the flange 13 so that a screwdriver may be inserted through said opening into engagement with the screw 32 after said screw has been brought into position opposite said opening. A cover plate 55 is provided for closing the opening 54, said cover plate being held in position by a screw 56 in such manner that it may be easily swung aside to expose said opening.

The operation of my improved clutch has been sufficiently described, but I wish to emphasize the fact that by my improved construction the clutch may be adjusted to compensate for wear without disturbing any of the parts, and that such adjustment is wholly independent of the operating levers 33 which are mounted in fixed positions and are not disturbed when the plate 21 is rotated to vary the thickness of the thrust member, the required adjustment being accomplished by movement of one of the component parts of the thrust member alone. An important advantage of my improved construction is that it is much less expensive to manufacture than any prior clutch of this general type of which I am aware as the annular plates 20—21 can readily be cast ready for installation without machining the inclined bearing surfaces thereof, it being necessary only to true up by grinding the flat bearing face of the plate 20.

What I claim as my invention and desire to secure by Letters Patent, is—

1. In a friction clutch, the combination of a driving clutch member and a driven clutch member coacting therewith, of means for operatively connecting said clutch members comprising a thrust member composed of inner and outer annular plates having coacting inclined engaging surfaces, one of said plates being rotatable relatively to the other, to vary the effective thickness of said thrust member, means carried by one of said clutch members for rotating the latter plate, and means for forcing said thrust member toward said driven clutch member.

2. In a friction clutch, the combination of a driving clutch member and a driven clutch member coacting therewith, of means for operatively connecting said clutch members comprising a thrust member composed of inner and outer annular plates having substantially parallel opposed faces provided with coacting inclined engaging surfaces, means engaging the outer plate for moving said thrust member toward said driven clutch member, and means for rotating one of said plates to vary the effective thickness of said thrust member.

3. In a friction clutch, the combination of a driving clutch member and a driven clutch member coacting therewith, of a thrust member for operatively connecting said clutch members comprising inner and outer annular plates having substantially radial opposed faces provided with coacting inclined bearing surfaces, means engaging the outer plate for moving said thrust member toward said driven clutch member, and means for rotating the outer plate to vary the effective thickness of said thrust member.

4. In a friction clutch, the combination with a clutch member having a recess at one side thereof, a coacting clutch member fitted in said recess, a thrust member of variable thickness fitted in said recess, means mounted peripherally on said first-mentioned clutch member and operable to vary the thickness of said thrust member, and means mounted in said recess and bearing against said thrust member for operatively connecting said clutch members.

5. In a friction clutch, the combination of a clutch member having a laterally projecting annular flange, a coacting clutch member fitted within the recess formed by said flange, a thrust member comprising an annular plate fitted in said recess and movable toward and from the latter clutch member, said plate being connected to rotate with said first mentioned clutch member, and an annular plate rotatable relatively to said first-mentioned plate, said plates having coacting bearing surfaces operating to vary the thickness of said thrust member when said rotatable plate is rotated relatively to the other, means carried by said first-mentioned clutch member for rotating said rotatable plate, and means for actuating said thrust member to force said clutch members together.

6. In a friction clutch, the combination of a driving clutch member, an annular thrust plate carried by said clutch member and rotating therewith, said plate being movable longitudinally of its axis, a driven clutch member interposed between said plate and said driving clutch member, a second annular plate rotatable independently of said driving clutch member and bearing against the outer face of said thrust plate, the contacting faces of said annular plates coöperating to form a thrust member of variable thickness, means for rotating said second plate to vary the thickness of said thrust member, and means for moving said plates to bind said driven clutch member between said driving clutch member and said annular thrust plate.

7. In a friction clutch, the combination with a clutch member having a recess at one side thereof, a coacting clutch member fitted in said recess, a thrust member fitted in said recess, comprising annular plates having inclined contacting surfaces, means mounted peripherally on said first-mentioned clutch member and operable to rotate one of said plates to vary the thickness of said thrust member, and means mounted in said recess and bearing against said thrust member for operatively connecting said clutch members.

8. In a friction clutch, the combination of a driving clutch member and a driven clutch member coacting therewith, of a thrust member for operatively connecting said clutch members comprising inner and outer annular plates in contact with each other, means engaging the outer plate for moving said thrust member toward said driven clutch member, and an adjusting screw mounted on said driving clutch member and engaging the outer plate for adjusting the same to vary the effective thickness of said thrust member.

9. In a friction clutch, the combination of a driving clutch member, an annular thrust plate carried by said clutch member and rotating therewith, said plate being movable longitudinally of its axis, a driven clutch member interposed between said plate and said driving clutch member, an annular plate rotatable independently of said driving clutch member and coöperating with said ing clutch member to form a thrust member of variable thickness, an adjusting screw mounted on said driving clutch member and engaging said rotatable plate, and means for moving said plates to bind said driven clutch member between said driving clutch member and said annular thrust plate.

10. In a friction clutch, the combination of a driving clutch member and a driven clutch member coacting therewith, of means for operatively connecting said clutch members comprising a thrust member composed of inner and outer annular plates having coacting inclined engaging surfaces adjustable relatively to each other to vary the effective thickness of said thrust member, springs yieldingly holding said plates in engagement with each other, and means for forcing said thrust member toward said driven clutch member.

11. In a friction clutch, the combination of a driving clutch member and a driven clutch member coacting therewith, of means for operatively connecting said clutch members comprising a thrust member composed of inner and outer annular plates having coacting inclined engaging surfaces, one of said plates being rotatable relatively to the other to vary the effective thickness of said thrust member, springs yieldingly holding said plates in engagement with each other, and means for forcing said thrust member toward said driven clutch member.

12. In a friction clutch, the combination of a driving clutch member and a driven clutch member coacting therewith, of means for operatively connecting said clutch members comprising a thrust member composed of inner and outer annular plates having coacting inclined engaging surfaces, one of said plates being rotatable relatively to the other to vary the effective thickness of said thrust member, an adjusting screw carried by said driving clutch member for engaging and rotating said rotatable plate, and means for forcing said thrust member toward said driven clutch member.

13. In a friction clutch, the combination of a driving clutch member and a driven clutch member coacting therewith, of means for operatively connecting said clutch members comprising an operating lever having a cylindrical journal pivotally supported by said driving clutch member, a thrust member interposed between said lever and said driven clutch member, said thrust member being adjustable to vary the effective thickness thereof, and a thrust bar carried by said lever at one side of the axis thereof and adapted to engage said thrust member.

14. In a friction clutch, the combination of a driving clutch member and a driven clutch member coacting therewith, of means for operatively connecting said clutch members comprising a thrust member composed of inner and outer annular plates having coacting inclined engaging surfaces, the outer plate being rotatable relatively to the other plate to vary the effective thickness of said thrust member, said outer plate having arcuate slots, posts carried by said inner plate and projecting through said slots, springs mounted on said posts for yieldingly holding said plates in engagement with each other, and means for forcing said thrust member toward said driven clutch member.

15. In a friction clutch, the combination of a driving clutch member and a driven clutch member coacting therewith, of means for operatively connecting said clutch members comprising a thrust member composed of inner and outer annular plates having coacting inclined engaging surfaces, the outer plate being rotatable relatively to the other plate to vary the effective thickness of said thrust member, said outer plate having arcuate slots, posts carried by said inner plate and projecting through said slots, springs mounted on said posts for yieldingly holding said plates in engagement with each other, externally operable means for rotating said outer plate, and means for forcing said thrust member toward said driven clutch member.

16. In a friction clutch, the combination of a driving clutch member and a driven clutch member coacting therewith, of means for operatively connecting said clutch members comprising an operating lever having a cylindrical journal pivotally supported by said driving clutch member, said lever being rigidly connected with said journal at opposite sides of the axis thereof, a thrust member interposed between said lever and said driving clutch member, and a thrust bar carried by said lever at one side of the axis thereof and adapted to engage said thrust member.

17. In a friction clutch, the combination of a driving clutch member and a driven clutch member coacting therewith, of means for operatively connecting said clutch members comprising a bifurcated operating lever, a cylindrical journal embraced by the members of said lever and pivotally supported by said driving clutch member, means rigidly connecting said lever with said journal at opposite sides of the axis thereof, a thrust member interposed between said lever and said driven clutch member, and a thrust bar carried by said lever at one side of the axis thereof and adapted to engage said thrust member.

18. In a friction clutch, the combination of a driving clutch member and a driven clutch member coacting therewith, of a plate secured to the marginal portion of said driving clutch member, blocks having bolts connected with said plate, cylindrical journals fitted in bearings in said blocks, levers rigidly connected with said journals, a thrust member interposed between said levers and said driven clutch member, and thrust bars carried by said levers at one side of the axes thereof and adapted to engage said thrust member.

19. In a friction clutch, the combination of a driving clutch member and a driven clutch member coacting therewith, of means for operatively connecting said clutch members comprising an operating lever pivotally supported by said driving clutch member, an annular thrust member interposed between said lever and said driven clutch member, said thrust member being composed of inner and outer annular plates adjustable relatively to each other to vary the effective thickness thereof, and a thrust bar carried by said lever at one side of the axis thereof and adapted to bear in a recess in said outer annular plate.

CHARLES E. WHITE.